(12) United States Patent
Yoshida et al.

(10) Patent No.: US 11,313,229 B2
(45) Date of Patent: Apr. 26, 2022

(54) IMPELLER, TURBOCHARGER, AND METHOD FOR FORMING FLOW FIELD FOR GAS IN IMPELLER AND TURBOCHARGER

(71) Applicant: MITSUBISHI HEAVY INDUSTRIES ENGINE & TURBOCHARGER, LTD., Sagamihara (JP)

(72) Inventors: Toyotaka Yoshida, Tokyo (JP); Toru Hoshi, Tokyo (JP); Yosuke Dammoto, Tokyo (JP); Yoji Akiyama, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 134 days.

(21) Appl. No.: 16/082,855

(22) PCT Filed: Mar. 31, 2016

(86) PCT No.: PCT/JP2016/061640
§ 371 (c)(1),
(2) Date: Sep. 6, 2018

(87) PCT Pub. No.: WO2017/168765
PCT Pub. Date: Oct. 5, 2017

(65) Prior Publication Data
US 2019/0136694 A1    May 9, 2019

(51) Int. Cl.
*F01D 5/04* (2006.01)
*F02B 39/00* (2006.01)
(Continued)

(52) U.S. Cl.
CPC ........... *F01D 5/048* (2013.01); *F01D 17/165* (2013.01); *F02B 37/24* (2013.01); *F02B 39/00* (2013.01);
(Continued)

(58) Field of Classification Search
CPC ......... F01D 5/048; F01D 17/165; F02B 37/24
See application file for complete search history.

(56) References Cited

U.S. PATENT DOCUMENTS

| 4,863,351 A | * | 9/1989 | Fischer | ................... B64C 11/00 |
| | | | | 416/203 |
| 8,096,777 B2 | * | 1/2012 | Yokoyama | ................ F01D 1/08 |
| | | | | 416/223 R |

(Continued)

FOREIGN PATENT DOCUMENTS

| EP | 0 267 405 A2 | 5/1988 |
| JP | 63-124806 A | 5/1988 |

(Continued)

OTHER PUBLICATIONS

International Search Report (Form PCT/ISA/210), dated Jul. 19, 2015, for International Application No. PCT/JP2016/061640, with an English translation.

(Continued)

*Primary Examiner* — Michael L Sehn
(74) *Attorney, Agent, or Firm* — Birch, Stewart, Kolasch & Birch, LLP

(57) ABSTRACT

A turbine wheel (12) is provided with: a disc (22) provided so as to be capable of rotating about a center axis (C); and a plurality of blades (23) provided to a disc surface (22*f*) at intervals in a circumferential direction, the blades (23) causing a gas guided in from radially outward leading edges (23*f*) to be expelled from trailing edges (23*r*) disposed on one side of each of the blades along the direction of the center axis (C). In each of the blades (23), in an area on one side along the direction of the center axis (C) including the trailing edge (23*r*), there is provided a concave surface (27) in which a positive-pressure surface (23*p*) on the rear side in a rotational direction (R) is recessed forward in the rota- (Continued)

tional direction (R), causing the gas to be dispersed entirely in the radial direction of the blade (23).

8 Claims, 7 Drawing Sheets

(51) Int. Cl.
F01D 17/16 (2006.01)
F02B 37/24 (2006.01)
F02C 6/12 (2006.01)

(52) U.S. Cl.
CPC ............ *F02C 6/12* (2013.01); *F05D 2220/40* (2013.01); *F05D 2250/712* (2013.01)

(56) References Cited

U.S. PATENT DOCUMENTS 8,474,433 B2* 7/2013 French .................... F01D 25/16
123/320

2009/0155076 A1* 6/2009 Jarrah ................... F04D 29/326
416/182

2010/0098548 A1 4/2010 Yokoyama et al.

FOREIGN PATENT DOCUMENTS

| JP | 2002-349202 A | 12/2002 |
| JP | 2008-128064 A | 6/2008 |
| JP | 2009-191839 A | 8/2009 |
| JP | 2012-47085 A | 3/2012 |
| JP | 2015-31219 A | 2/2015 |

OTHER PUBLICATIONS

Written Opinion of the International Searching Authority ( Form PCT/ISA/237), dated Jul. 19, 2016, for International Application No. PCT/JP2016/061640, with an Engiish translation.

* cited by examiner

IMPELLER, TURBOCHARGER, AND METHOD FOR FORMING FLOW FIELD FOR GAS IN IMPELLER AND TURBOCHARGER

TECHNICAL FIELD

The present invention relates to an impeller, a turbocharger, and a method for forming a flow field for a gas in the impeller and the turbocharger.

BACKGROUND ART

For example, as described in Patent Literature PTL 1 or the like, a turbocharger rotates a turbine wheel by an exhaust gas which is fed from an engine to a turbine housing. A compressor wheel provided in a compressor housing is rotated in accordance with the rotation of the turbine wheel, and thus, air is compressed. The air compressed by the compressor is supplied to the engine.

The turbine wheel integrally includes a disk-shaped disk and a plurality of blades (rotor blades) provided on one surface side of the disk at intervals in a circumferential direction. The exhaust gas fed from the engine passes through a scroll flow path provided on a radially outer side of the turbine wheel, flows radially inward while swirling in the circumferential direction, and collides with the blades of the turbine wheel. Accordingly, the turbine wheel is rotationally driven. The exhaust gas which has collided with the blades of the turbine wheel flows radially inward through a flow path formed between the turbine housing and the disk and is discharged along a central axis of the turbine wheel from an inner peripheral side of the turbine wheel.

CITATION LIST

Patent Literature

[PTL 1] Japanese Unexamined Patent Application Publication No. 2015-31219

SUMMARY OF INVENTION

Technical Problem

In the vicinity of a trailing edge of the blade, the exhaust gas flows through a gas flow path between the disk of turbine wheel and a shroud provided on a radially outer side of the blade. In this case, a flow rate distribution of the exhaust gas may be nonuniform. If the flow rate distribution is nonuniform in this manner, in the exhaust gas fed out from the trailing edge of the blade, a flow of a portion having a high flow rate and a flow of a portion having a low flow rate are mixed with each other so as to average the flow rate distribution on a downstream side, and thus, turbulence occurs in the exhaust gas. Accordingly, efficiency of the turbine decreases.

An object of the present invention is to provide an impeller and a turbocharger capable of improving uniformity of the flow rate distribution of a gas flow in the vicinity of the trailing edge of the blade of the turbine wheel and increasing the efficiency of the turbine, and a method for forming a flow field for a gas in the impeller and the turbocharger.

Solution to Problem

According to a first aspect of the present invention, there is provided an impeller including: a disk which is formed, on one side in a central axis direction, in a disk shape having a disk front surface gradually going a radially outer side toward the other side in the central axis direction and is rotatably provided around the central axis; and a plurality of blades which are provided on the disk front surface at intervals in a circumferential direction around the central axis and form a flow path through which a gas introduced from a leading edge on the radially outer side about the central axis is discharged from a trailing edge on the one side in the central axis direction while being introduced into a radially inner side, in which each blade includes a concave curved surface, which is recessed toward a front side in a rotation direction of the disk and disperses the gas in the entire radial direction of the blade on the trailing edge, in a region, on the one side in the central axis direction, provided on a rear side in the rotation direction of the disk and including at least the trailing edge of a pressure surface which collides with the gas.

If the gas introduced from the leading edge on the radially outer side collides with the pressure surface of the blade, the impeller rotates around the central axis. A centrifugal force is applied to the gas flowing from the leading edge toward the trailing edge by the rotation of the impeller, and the gas tends to bias toward the radially outer side as it approaches the trailing edge. However, in the region including at least the trailing edge of the blade, the concave curved surface which disperses the gas flowing from the leading edge toward the trailing edge in the entire radial direction of the blade is formed in the pressure surface, and thus, the gas is not easily based toward the radially outer side. Accordingly, the flow of the gas is dispersed in the entire radial direction on a downstream side of the trailing edge of the blade, unbalance of a flow rate on the downstream side of the trailing edge of the blade does not easily occur, and thus, it is possible to suppress a loss.

According to a second aspect of the present invention, in the impeller of the first aspect, the concave curved surface may be formed in only a partial region in the central axis direction including the trailing edge of the blade.

In this way, the concave curved surface is formed in only the partial region including the trailing edge of the blade, and thus, even when the gas flowing from the leading edge of the blade toward the trailing edge biases toward the radially outer side by the centrifugal force in front of the concave curved surface, the gas enters the concave curved surface, and thus, the flow direction of the gas is changed. Accordingly, in the vicinity of the trailing edge of the blade, the flow of the gas is effectively controlled, and thus, biasing caused by the centrifugal force can be suppressed.

In addition, it is possible to suppress the biasing of the gas caused by the centrifugal force without forming the concave curved surface over the entirety from the leading edge of the blade to the trailing edge thereof. Accordingly, even in a case where the blade has a complicated three-dimensional shape, it is possible to suppress a difficulty of manufacturing the blade.

According to a third aspect of the present invention, in the impeller according to the first aspect, the concave curved surface may be formed such that an intermediate portion between a base portion and a tip portion of the blade offsets to the front side in the rotation direction with respect to an imaginary line which connects the base portion of the blade and the tip portion of the blade.

According to this configuration, the gas which collides with the pressure surface of the blade is easily collected on the intermediate portion side which is recessed to be most offset, and thus, it is possible to suppress the biasing of the exhaust gas toward the tip portion side on the radially outer side. In addition, the gas biasing toward the radially outer side in front of the concave curved surface flows toward the intermediate portion in the concave curved surface, and, thereafter, flows also toward the base portion side on the radially inner side by a momentum (inertia) of the gas. In this way, the gas is effectively dispersed in the entire radial direction of the blade.

According to a fourth aspect of the present invention, in the impeller of the first aspect, the concave curved surface may be formed to be inclined such that a tip portion of the blade is positioned in the front side in the rotation direction with respect to a base portion of the blade.

According to this configuration, efficiency of rotating the impeller by collision of the gas with the pressure surface of the blade and an effect of suppressing the biasing of the gas toward the radially outer side by the centrifugal force in the vicinity of the trailing edge of the blade can balance with each other.

According to a fifth aspect of the present invention, there is provided a turbocharger including: a rotating shaft which extends along an axis; a turbine wheel which includes the impeller according to any one of the first to fourth aspects and is provided on a first end portion side of the rotating shaft; a compressor wheel which is provided on a second end portion side of the rotating shaft; a bearing housing which rotatably supports the rotating shaft; and a turbine housing which accommodates the turbine wheel.

Accordingly, the gas is not easily biased toward the radially outer side and is dispersed in the entire radial direction, and thus, the efficiency of the turbine improved, and it is possible to improve efficiency of the entire turbocharger.

According to a sixth aspect of the present invention, in the turbocharger of the fifth aspect, the turbocharger may further include a scroll flow path which is formed in the turbine housing and is continuous in a circumferential direction on a radially outer side of the turbine wheel and through which a gas rotationally driving the turbine wheel flows, a nozzle flow path which introduces the gas from the scroll flow path toward a radially inner side and supplies the gas to the turbine wheel, and a vane which adjusts an introduction amount of the gas in the nozzle flow path.

According to this configuration, the turbocharger becomes a variable displacement type turbocharge capable of adjusting a gas introduction amount to the turbine wheel. In the variable displacement type turbocharger, the nozzle flow path is narrowed by the vane, the nozzle flow path is narrowed in a small flow rate region having a small gas introduction amount, the flow rate of the gas increases, and thus, the gas having a strong swirl component in the direction of the scroll flow path flows into the blade. Accordingly, the flow is easily biased toward the radially outer side by the centrifugal force of the impeller. Meanwhile, the biasing of the flow can be suppressed by the impeller having the concave curved surface in the blade. Accordingly, unbalance of the flow rate does not easily occur on the downstream side of the trailing edge of the blade, and it is possible to suppress a loss.

According to a seventh aspect of the present invention, there is provided an impeller including: a disk which is formed, on one side in a central axis direction, in a disk shape having a disk front surface gradually going a radially outer side toward the other side in the central axis direction and is rotatably provided around the central axis; and a plurality of blades which are provided on the disk front surface at intervals in a circumferential direction around the central axis and form a flow path through which a gas introduced from a leading edge on the radially outer side about the central axis is discharged from a trailing edge on the one side in the central axis direction while being introduced into a radially inner side, in which when the disk rotates, the gas introduced from the leading edge forms a flow field, which flows from the radially outer side toward the radially inner side in the vicinity of the trailing edge, in the flow path.

According to an eighth aspect of the present invention, there is provided a method for forming a flow field for a gas in an impeller including a disk which is formed, on one side in a central axis direction, in a disk shape having a disk front surface gradually going a radially outer side toward the other side in the central axis direction and is rotatably provided around the central axis, and a plurality of blades which are provided on the disk front surface at intervals in a circumferential direction around the central axis and form a flow path through which a gas introduced from a leading edge on the radially outer side about the central axis is discharged from a trailing edge on the one side in the central axis direction while being introduced into a radially inner side, in which when the disk rotates, the gas introduced from the leading edge forms a flow field, which flows from the radially outer side toward the radially inner side in the vicinity of the trailing edge, in the flow path.

According to a ninth aspect of the present invention, there is provided a method for forming a flow field for a gas in a turbocharger including a rotating shaft which extends along an axis, a turbine wheel which includes the impeller capable of forming the flow field according to claim 8 and is provided on a first end portion side of the rotating shaft, a compressor wheel which is provided on a second end portion side of the rotating shaft, a bearing housing which rotatably supports the rotating shaft, a turbine housing which accommodates the turbine wheel, a scroll flow path which is formed in the turbine housing and is continuous in a circumferential direction on a radially outer side of the turbine wheel and through which a gas rotationally driving the turbine wheel flows, a nozzle flow path which introduces the gas from the scroll flow path toward a radially inner side and supplies the gas to the turbine wheel, and a vane which adjusts an introduction amount of the gas in the nozzle flow path, in which in a state where the nozzle flow path is narrowed by the vane, when the disk rotates, the gas introduced from the leading edge forms a flow field, which flows from the radially outer side toward the radially inner side in the vicinity of the trailing edge, in the flow path.

Advantageous Effects of Invention

According to the impeller, the turbocharger, and the method for forming a flow field for a gas in the impeller and the turbocharger, the uniformity of the flow rate distribution of the gas in the vicinity of the trailing edge of the blade of the turbine wheel is improved, and it is possible to increase the efficiency of the turbine.

DESCRIPTION OF EMBODIMENTS

Figure 1:
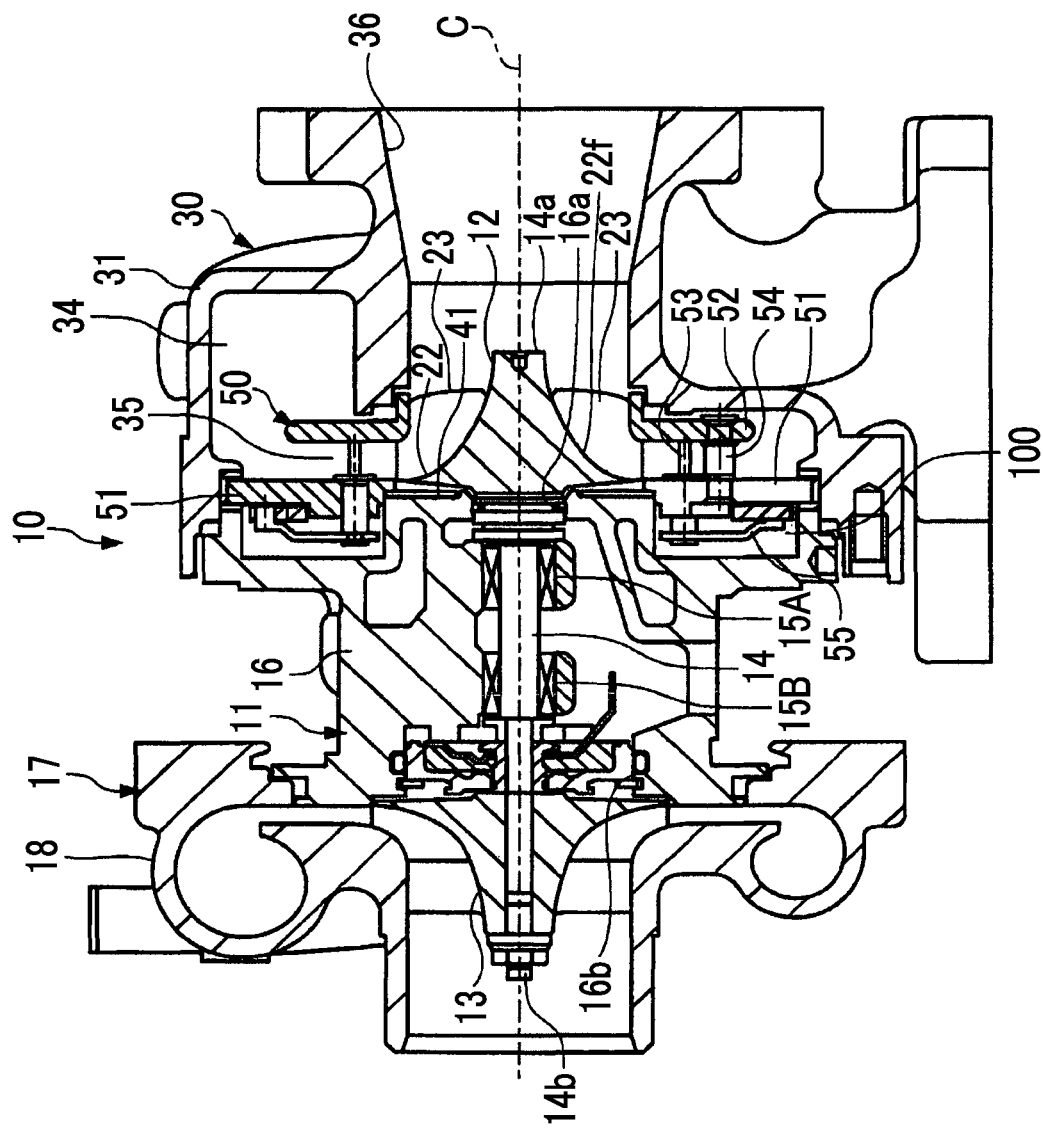
FIG. 1 is a sectional view showing the entire configuration of a turbocharger according to an embodiment of the present invention.

FIG. 1 is a sectional view showing the entire configuration of a turbocharger according to an embodiment of the present invention.

As shown in FIG. 1, a turbocharger 10 of the present embodiment includes a turbocharger body 11, a compressor 17, and a turbine 30. For example, the turbocharger 10 is mounted on an automobile or the like as an auxiliary machine of an engine in a state where a rotating shaft 14 extends in a horizontal direction.

The turbocharger body 11 includes the rotating shaft 14, bearings 15A and 15B, and a bearing housing 16.

The bearing housing 16 is supported by a vehicle body or the like via a bracket (not shown), the compressor 17, the turbine 30, or the like. The bearing housing 16 includes an opening portion 16a on one end side thereof and an opening portion 16b on the other end side thereof.

The bearings 15A and 15B are provided inside the bearing housing 16. The bearings 15A and 15B rotatably supports the rotating shaft 14 around a central axis C.

A first end portion 14a and a second end portion 14b of the rotating protrudes outside the bearing housing 16 through the opening portions 16a and 16b.

The compressor 17 is provided on the other end side of the bearing housing 16. The compressor 17 includes a compressor wheel 13 and a compressor housing 18.

The compressor wheel 13 is provided on the second end portion 14b of the rotating shaft 14 outside the bearing housing 16. The compressor wheel 13 rotates around the central axis C integrally with the rotating shaft 14.

The compressor housing 18 is connected to the other end side of the bearing housing 16. The compressor wheel 13 is accommodated in the compressor housing 18.

The turbine 30 is provided on one end side of the bearing housing 16. The turbine 30 includes a turbine wheel (impeller) 12 and a turbine housing 31.

The turbine wheel 12 is integrally provided with the first end portion 14a of the rotating shaft 14 outside the bearing housing 16. The turbine wheel 12 rotates around the central axis C integrally with the rotating shaft 14.

The turbine housing 31 is connected to the one end side of the bearing housing 16. The turbine wheel 12 is accommodated inside the turbine housing 31.

In the turbocharger 10, the turbine wheel 12 provided in the turbine 30 is rotated about the central axis (axis) C by a flow of an exhaust gas (gas) supplied from an engine (not shown) to the turbine 30. The rotating shaft 14 and the compressor wheel 13 are rotated about the central axis C integrally with the turbine wheel 12. The compressor wheel 13 provided in the compressor 17 is rotated to compress air. The air compressed by the compressor 17 is supplied to the engine (not shown).

Next, a configuration of a peripheral portion including the turbine wheel 12 of the turbine 30 will be described.

Figure 2:
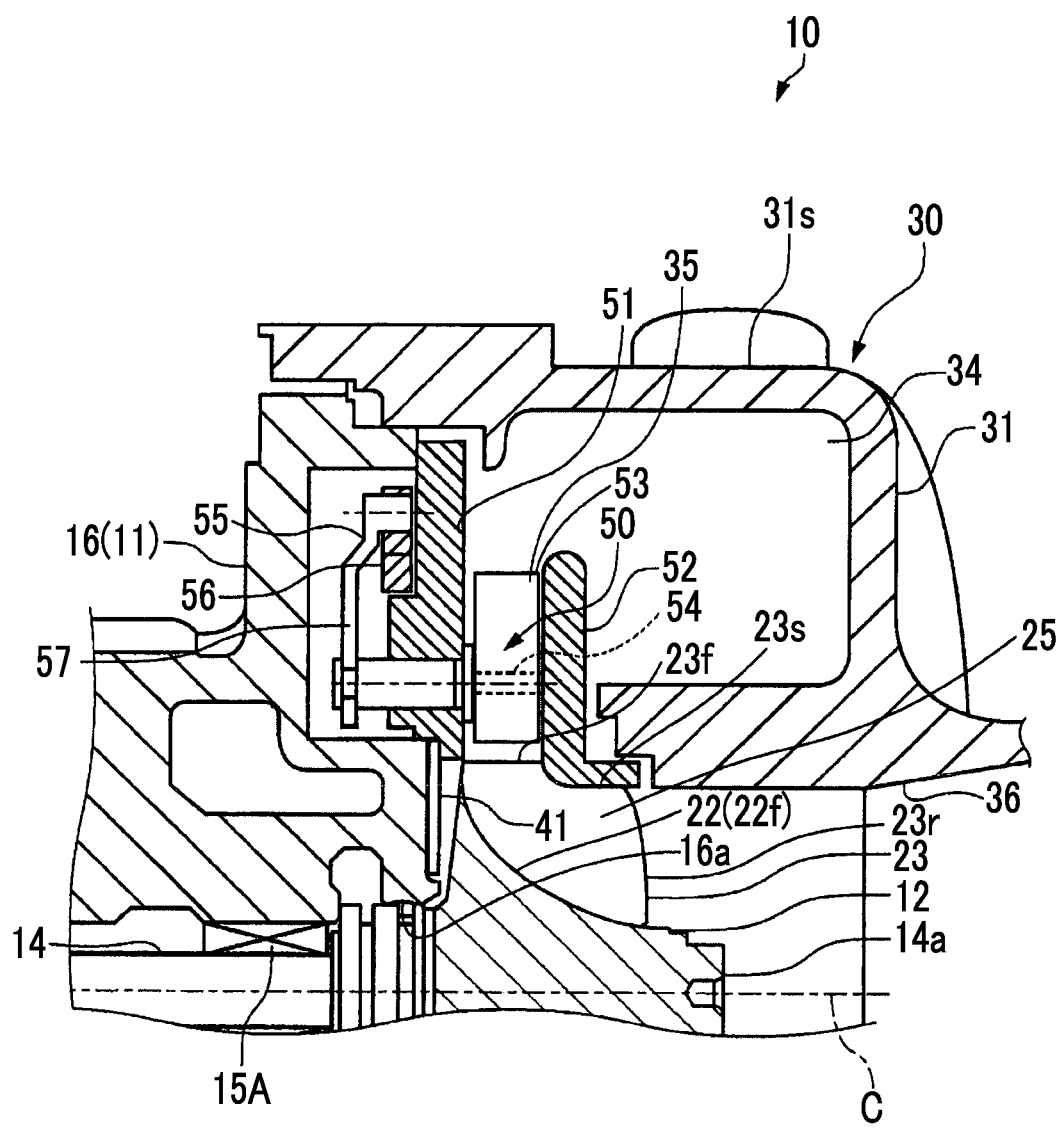
FIG. 2 is a sectional view showing a configuration around a turbine wheel constituting the turbocharger.

FIG. 2 is a sectional view showing a configuration around the turbine wheel constituting the turbocharger.

As shown in FIG. 2, the turbine housing 31 includes a gas introduction portion (not shown), a scroll flow path 34, a nozzle flow path 35, and an exhaust portion 36.

The gas introduction portion (not shown) feeds the exhaust gas discharged from the engine (not shown) to the scroll flow path 34.

The scroll flow path 34 is continued to the gas introduction portion (not shown) and is continuously formed in a circumferential direction radially outside the turbine wheel 12. The scroll flow path 34 forms a flow path through which the exhaust gas rotationally driving the turbine wheel 12 flows in the circumferential direction.

The nozzle flow path 35 is formed on a side close to the bearing housing 16 in the turbine housing 31. The nozzle flow path 35 is formed on the entire circumference in the circumferential direction such that the scroll flow path 34 and the turbine wheel 12 communicate with each other in a radial direction.

The exhaust portion 36 through which the exhaust gas discharged from the turbine wheel 12 flows. The exhaust portion 36 is continuously formed from an outer peripheral portion of the turbine wheel 12 in a direction away from the turbocharger body 11 along the central axis C of the rotating shaft 14.

In the turbine 30, the exhaust gas which has flowed in from the gas introduction portion (not shown) flows along the scroll flow path 34 in the circumferential direction on the outer peripheral side of the turbine wheel 12. The exhaust gas flowing in the circumferential direction flows toward a radially inner side through the nozzle flow path 35 and abuts against a blade 23 of the turbine wheel 12, and thus, the turbine wheel 12 is rotationally driven. The exhaust gas which has passed through the turbine wheel 12 is discharged from an inner peripheral side of the turbine wheel 12 into the exhaust portion 36.

A variable vane mechanism 50 which adjusts an amount of the exhaust gas supplied from the scroll flow path 34 to the turbine wheel 12 through the nozzle flow path 35 is provided in the nozzle flow path 35.

The variable vane mechanism 50 includes a nozzle mount 51, a nozzle plate 52, a vane 53, and a drive portion 55.

The nozzle mount 51 is provided on the bearing housing side of the nozzle flow path 35 and is formed in an annular plate shape which is positioned in a plane orthogonal to the central axis C.

The nozzle plate 52 is provided on a side opposite to the nozzle mount 51 in the nozzle flow path 35 with a gap between the nozzle mount 51 and the nozzle plate 52. A portion between the nozzle mount 51 and the nozzle plate 52 becomes the nozzle flow path 35.

The vane 53 is formed in a plate shape and is provided between the nozzle mount 51 and the nozzle plate 52. A plurality of vanes 53 are provided in the nozzle flow path 35 continuous in the circumferential direction at intervals in the circumferential direction. Each vane 53 is rotatably supported around a central axis of a shaft 54 by the shaft 54 penetrating the nozzle mount 51 in the central axis C direction.

The drive portion 55 rotates the shaft 54 protruding from the nozzle mount 51 to the bearing housing 16 side to adjust an angle of the vane 53. The drive portion 55 protrudes toward the bearing housing 16 side with respect to the nozzle mount 51. The drive portion 55 includes a drive ring 56 and a link arm 57.

The drive ring 56 is formed in an annular shape and is provided radially outside the shaft 54. The drive ring 56 is oscillatingly provided in the circumferential direction by an actuator (not shown) or the like.

The link arm 57 is connected to each shaft 54. One end of each link arm 57 is connected to the shaft 54, and the other end thereof is rotatably connected to the drive ring 56. If the drive ring 56 rotates, the link arm 57 rotates about the shaft 54. Accordingly, the angle of the vane 53 is changed around the central axis of the shaft 54.

In addition, a back plate 41 which closes a gap in an outer peripheral portion of the first end portion 14a of the rotating shaft 14 is provided radially inside the nozzle mount 51.

Next, a configuration of the turbine wheel 12 will be described.

The turbine wheel 12 includes a disk 22 and blades 23.

The disk 22 has a predetermined length in the central axis C direction, and is fixed to the first end portion 14a of the rotating shaft 14.

The disk 22 is formed in a disk shape extending to the radially outer side and is rotatably provided about the central axis C integrally with the rotating shaft 14. The disk 22 includes a disk surface (surface) 22f on the exhaust portion 36 side on one side in the central axis C direction. The disk surface 22f is formed by a curved surface which is gradually recessed from a side close to the exhaust portion 36 on the one side in the central axis C direction toward the bearing housing 16 on the other side in the central axis C direction toward the radially outer side in the radial direction.

A plurality of blades 23 are provided on the disk surface 22f at intervals in the circumferential direction around the central axis C. Each of the blades 23 includes a leading edge 23f which faces the nozzle flow path 35 toward the radially outer side and a trailing edge 23r which faces the exhaust portion 36 toward one side in the central axis C direction. The blade 23 is formed such that an outer edge 23s on the radially outer side is close to the nozzle plate 52 positioned on the radially outer side.

The exhaust gas flowing toward the radially inner side from the nozzle flow path 35 on the radially outer side of the turbine wheel 12 passes through an impeller flow path of the blades 23 adjacent to each other in the circumferential direction between the disk surface 22f of the disk 22 and the nozzle plate 52. A direction of a flow of the exhaust gas which had flowed from the leading edge 23f of the blade 23 toward the radially inner side is changed by the curvature of the disk surface 22f, and thus, the exhaust gas is discharged along the central axis C from the trailing edge 23r of the blade 23.

Figure 3:
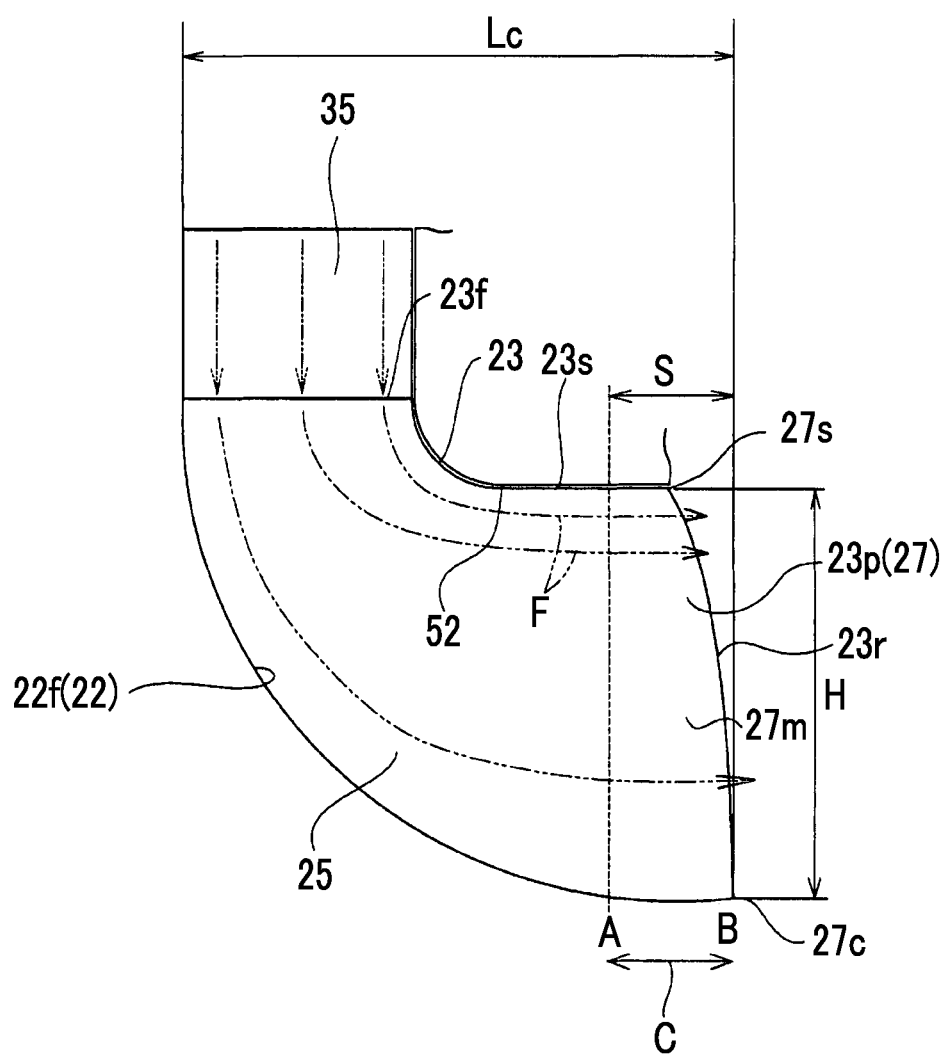
FIG. 3 is a view showing a blade of the turbine wheel.
Figure 4:
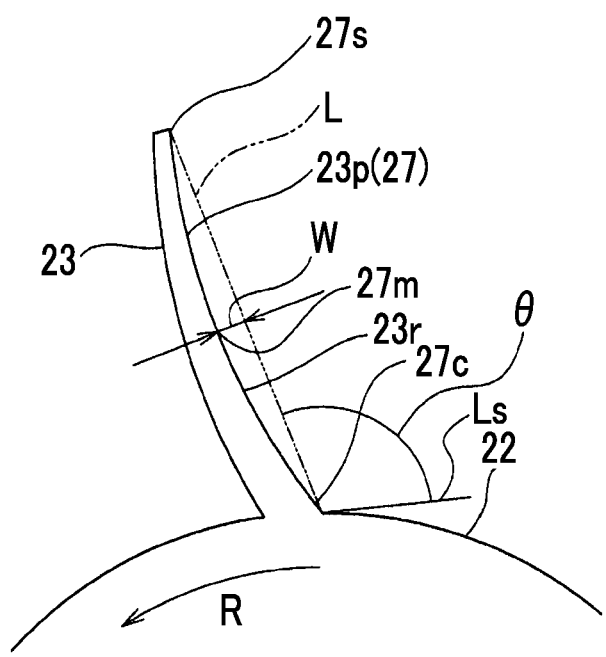
FIG. 4 is a view when the blade is viewed in a central axis direction of the turbine wheel.

Here, as shown in FIGS. 3 and 4, in each blade 23, a concave curved surface 27 is formed, which is recessed toward a front side in a rotation direction R of the turbine wheel 12 is formed in only a region S including the trailing edge 23r on a pressure surface 23p receiving the flow of the exhaust gas flowing in through the nozzle flow path 35 from the scroll flow path 34.

The concave curved surface 27 is formed to be curved such that an intermediate portion 27m of the blade 23 is positioned to be offset to the front side in the rotation direction R with respect to a root portion (base portion) 27c on the inner peripheral side of the blade 23 and a tip portion 27s on an outer peripheral side of the blade 23.

As shown in FIG. 3, the region S in which the concave curved surface 27 is formed is set from a position B of the trailing edge 23r to a position A which is 20% of a blade length Lc of the blade 23 in the central axis C direction toward the other side in the central axis C direction. In the region S, the concave curved surface 27 is formed such that a curvature thereof gradually decreases from the position A toward the position B.

In addition, the concave curved surface 27 may be formed with a predetermined curvature or may be formed with a free curved surface.

As shown in FIG. 4, for example, preferably, a straight line (imaginary line) L which connects the root portion 27c and the tip portion 27s of the blade 23 in the trailing edge 23r of the concave curved surface 27 to each other and an offset dimension W of the intermediate portion 27m of the concave curved surface 27 satisfies $0.03H \leq W \leq 0.1H$ with respect to a radial dimension (blade height) H (refer to FIG. 3) of the trailing edge 23r.

In addition, for example, preferably, the concave curved surface 27 is inclined to the front side in the rotation direction R in a range of $100° \leq \theta \leq 140°$ of an angle $\theta$ between the straight line L connecting the root portion 27c and the tip portion 27s to each other and a tangent Ls at a position of the root portion 27c on an outer peripheral surface of the hub 21.

Here, for example, if the blade 23 is formed such that the curvature of the concave curved surface 27 is greater than the offset dimension W, a flow of the exhaust gas rising upward along the blade surface from the disk surface 22f side toward the outer edge 23s is suppressed, and an effect of bringing the flow to the outer edge 23s side is stronger. Meanwhile, as a rejection event, the flow of the exhaust gas on the side close to the outer edge 23s decreases, and thus, a flow balance inside the turbine wheel 12 collapses. Accordingly, the flow of the exhaust gas with respect to the blade 23 decreases. This decreases efficiency of the turbine. In addition, if the blade 23 is formed such that the curvature of the concave curved surface is greater than the offset dimension W, centrifugal stress applied to the blade surface of the blade 23 is excessive, and thus, a strength condition of the blade 23 may not be satisfied.

According to the turbine wheel 12 and the turbocharger of the above-described embodiment, the exhaust gas introduced from the leading edge 23f on the radially outer side collides with the pressure surface 23p of the blade 23, and thus, the turbine wheel 12 rotates around the central axis C. A centrifugal force is applied to the exhaust gas flowing from the leading edge 23f toward the trailing edge 23r by the rotation of the turbine wheel 12, and the exhaust gas tends to bias toward the radially outer side as it approaches the trailing edge 23r. However, the pressure surface 23p of the blade 23 is the concave curved surface 27, and thus, the exhaust gas is not easily biased toward the radially outer side and is dispersed in the entire radial direction. Accordingly, unbalance of a flow rate on the downstream side of the trailing edge 23r of the blade does not easily occur, and thus, it is possible to suppress a loss. As a result, uniformity in a flow rate distribution of the gas on the downstream side of the trailing edge 23r of the blade 23 of the turbine wheel 12 is improved, and it is possible to increase the efficiency of the turbine.

In addition, in the blade 23, the concave curved surface 27 is formed in only the partial region S in the central axis C direction including the trailing edge 23r. In this way, the concave curved surface 27 is formed in only the partial region S including the trailing edge 23r of the blade 23, and thus, even when the exhaust gas flowing from the leading edge 23f of the blade 23 toward the trailing edge 23r biases toward the radially outer side by the centrifugal force in front of the concave curved surface 27, the exhaust gas enters the concave curved surface 27, and thus, the flow direction of the exhaust gas is changed. Accordingly, in the vicinity of the trailing edge 23r of the blade 23, the flow of the exhaust gas is effectively controlled, and thus, biasing caused by the centrifugal force can be suppressed.

In addition, it is possible to suppress the biasing of the exhaust gas caused by the centrifugal force without forming the concave curved surface 27 over the entirety from the leading edge 23f of the blade 23 to the trailing edge 23r thereof. Accordingly, even in a case where the blade 23 has a complicated three-dimensional shape, it is possible to suppress a difficulty of manufacturing the blade 23 by forming the concave curved surface 27.

In addition, the concave curved surface 27 is formed such that the intermediate portion 27m offsets to the front side in the rotation direction R with respect to the straight line L which connects the root portion 27c of the blade 23 and the tip portion 27s of the blade 23 to each other. Accordingly, the exhaust gas which collides with the pressure surface 23p of the blade 23 is easily collected on the intermediate portion 27m side which is recessed to be most offset, and thus, it is possible to suppress the biasing of the exhaust gas toward the tip portion 27s side on the radially outer side. In addition, the exhaust gas biasing toward the radially outer side in front of the concave curved surface 27 flows from the radially outer side toward the intermediate portion 27m in the concave curved surface 27, and, thereafter, flows also toward the root portion 27c side on the radially inner side by a momentum (inertia) of the exhaust gas. That is, the exhaust gas forms a flow field, in which the exhaust gas flows from the radially outer side toward the radially inner side in the vicinity of the trailing edge 32 (for example, in the embodiment), in the flow path. In this way, the exhaust gas is effectively dispersed in the entire radial direction of the blade 23.

In addition, the concave curved surface 27 is formed to be inclined such that the tip portion 27s is positioned in front of the rotation direction R with respect to the root portion 27c of the blade 23. Accordingly, this balances efficiency of rotating the turbine wheel 12 by collision of the exhaust gas with the pressure surface 23p of the blade 23 and an effect of suppressing the biasing of the exhaust gas toward the radially outer side by the centrifugal force in the vicinity of the trailing edge 23r of the blade 23.

The turbocharger 10 in this embodiment is a variable displacement type turbocharger which adjusts a gas introduction amount by changing a flow path cross-sectional area of the nozzle flow path 35 using the vane 53. In the variable displacement type turbocharger 10, the nozzle flow path 35 is narrowed by the vane 53. Accordingly, the nozzle flow path 35 is narrowed in a small flow rate region having a small gas introduction amount, the flow rate of the exhaust gas increases, and thus, the gas having a strong swirl component flows into the blade 23. Accordingly, the flow is easily biased toward the radially outer side by the centrifugal force of the turbine wheel 12. Meanwhile, the biasing of the flow can be suppressed by the turbine wheel 12 having the concave curved surface 27 in the blade 23. Accordingly, unbalance of the flow rate does not easily occur on the downstream side of the trailing edge 23r of the blade 23, and it is possible to suppress a loss.

Accordingly, it is possible to increase the efficiency of the turbocharger 10 in the region having a small flow rate, and it is possible to increase performance of the engine into which the gas compressed by the turbocharger 10 is fed.

Analysis Example

Here, the flow of the exhaust gas in the blade 23 having the concave curved surface 27 as described above was analyzed by simulation, and the result is shown.

Figure 5:
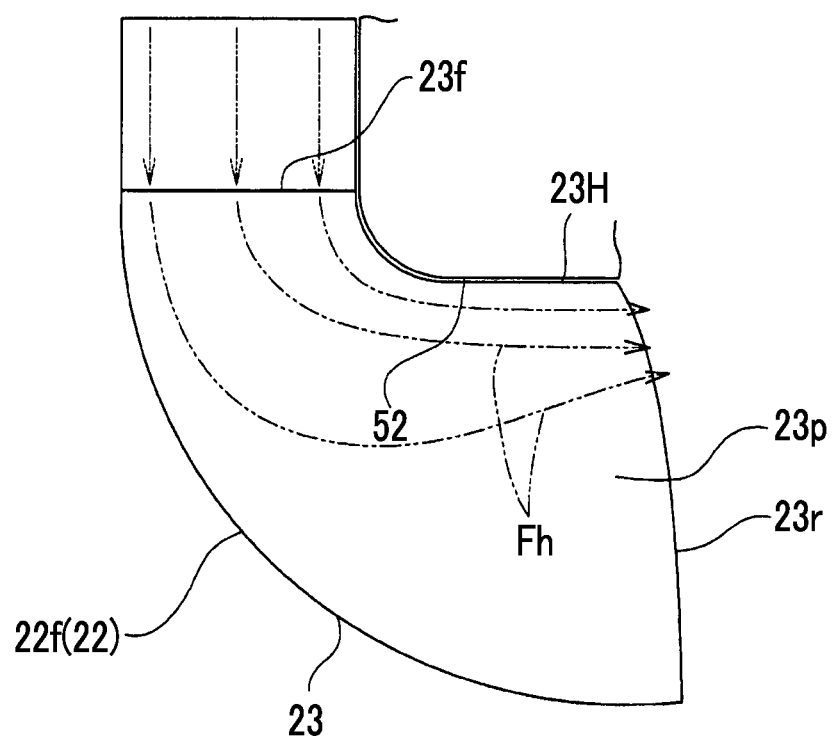
FIG. 5 is a view showing an aspect of a flow in a blade having no concave curved surface used for a comparison of analysis.

As shown in FIG. 5, as a comparative example, the blade 23H not having the concave curved surface was analyzed.

Figure 6:
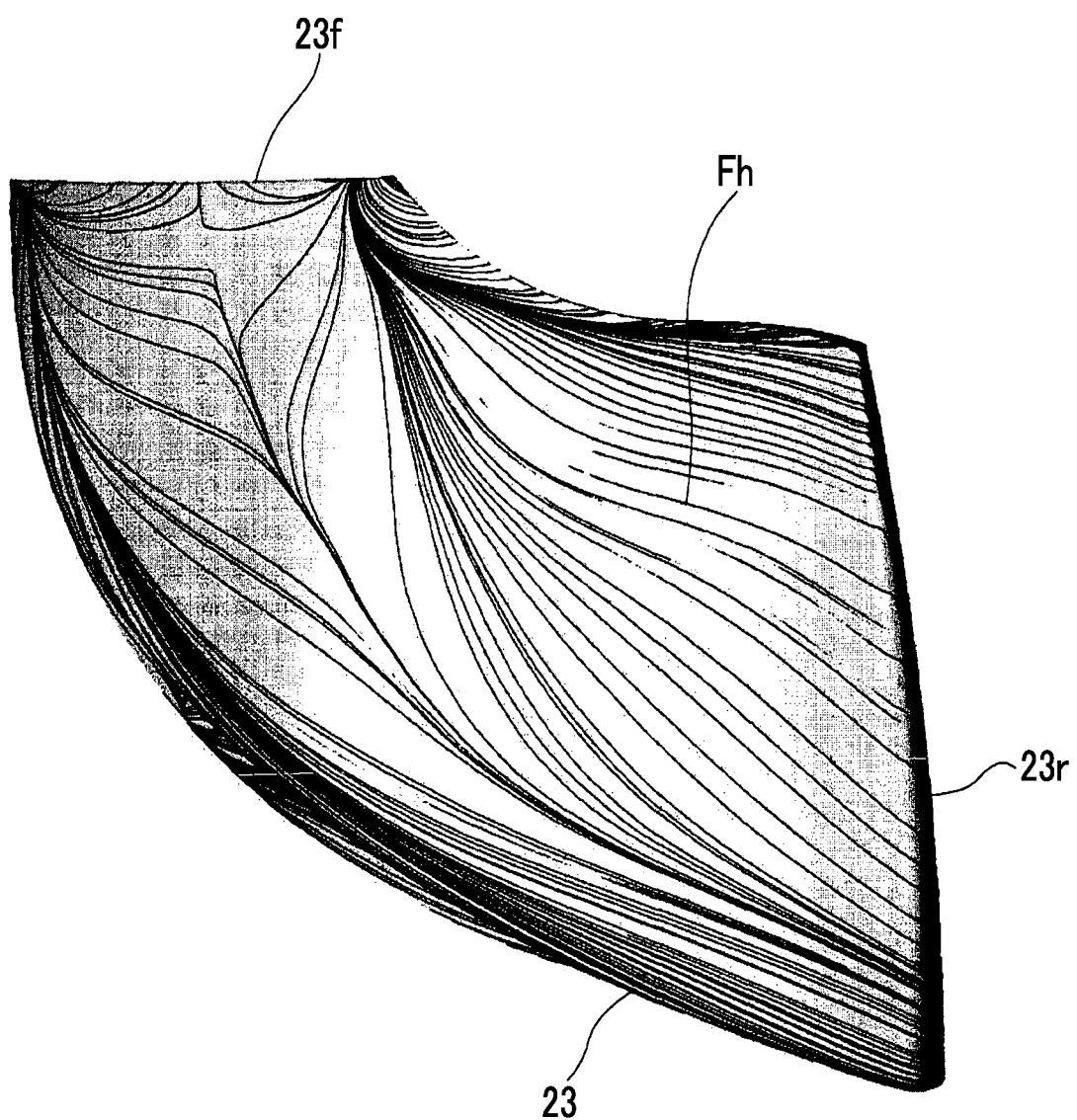
FIG. 6 is a view showing an analysis result of a flow of a gas from a leading edge toward a trailing edge in the blade shown in FIG. 5.

As shown in FIGS. 5 and 6, in a blade 23H not having the concave curved surface, a flow Fh of the exhaust gas which has flowed from the leading edge 23f is biased toward the radially outward in the vicinity of the trailing edge 23r by the centrifugal force.

Figure 7:
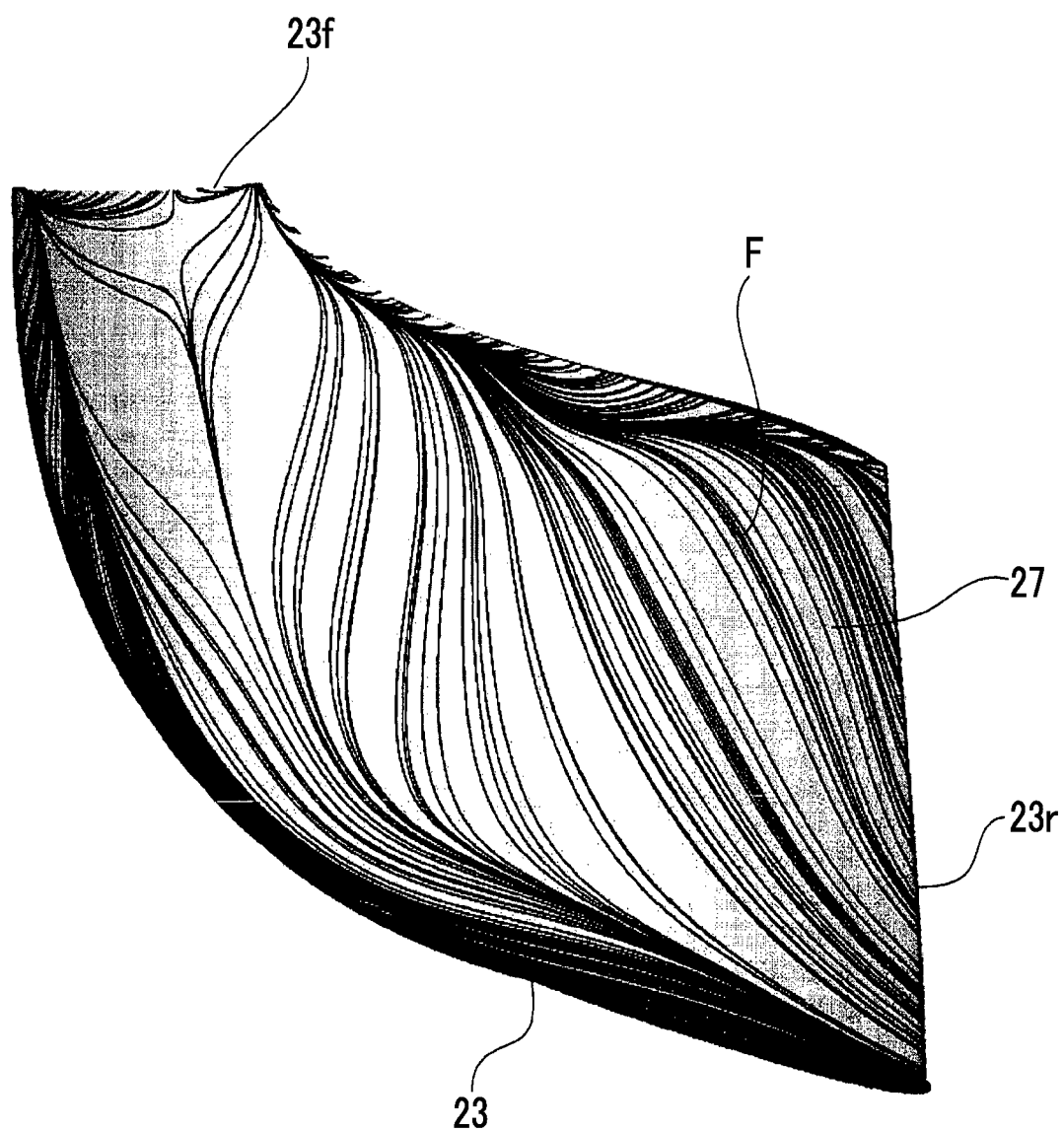
FIG. 7 is a view showing an analysis result of a flow of a gas from a leading edge toward a trailing edge in the blade shown in the embodiment.

Meanwhile, as shown in FIGS. 3 and 7 and as described in the embodiment, in the blade 23 having the concave curved surface 27, a flow F of the exhaust gas which has flowed from the leading edge 23f flows from the radially outer side toward the radially inner side in the vicinity of the trailing edge 23r. That is, the exhaust gas forms the flow field, in which the exhaust gas flows from the radially outer side toward the radially inner side in the vicinity of the trailing edge 23r, in the flow path. In this way, it was confirmed that biasing of the flow F in the vicinity of the trailing edge 23r can be suppressed by providing the concave curved surface 27 in the blade 23.

OTHER EMBODIMENTS

The present invention is not limited to the above-described embodiment, and design can be changed within a scope which does not depart from the gist of the present invention.

For example, in the concave curved surface 27, the intermediate portion 27m offsets to the front side in the rotation direction R with respect to the root portion 27c and the tip portion 27s of the blade 23. However, the position of the intermediate portion 27m in the radial direction or the offset dimension W of the intermediate portion 27m may be appropriately changed.

For example, the configuration of each portion such as the turbocharger body 11, the compressor 17, or the turbine of the turbocharger 10 is not limited to the above-described configuration, and may be changed to other configurations.

In addition, in the above-described embodiment, the flow rate is adjusted by rotating the vane 53. However, a slide vane may be adopted, in which the flow rate is adjusted by moving a vane having a fixed angle forward or rearward in the nozzle flow path. In addition, configurations similar to those described above can be applied to the turbocharger not having a flow adjustment.

INDUSTRIAL APPLICABILITY

The present invention can be applied to the impeller and the turbocharger. According to the present invention, the concave curved surface is formed in the region including at least the trailing edge of the pressure surface of the impeller, and thus, the uniformity of the flow rate distribution of the gas in the vicinity of the trailing edge of the blade of the turbine wheel is improved, and it is possible to increase the efficiency of the turbine.

REFERENCE SIGNS LIST

10: turbocharger
11: turbocharger body
12: turbine wheel (impeller)
12w: turbine blade
13: compressor wheel
14: rotating shaft
14a: first end portion
14b: second end portion
15A, 15B: bearing 16: bearing housing
16a: opening portion
16b: opening portion
17: compressor
18: compressor housing
21: hub
22: disk
22f: disk surface (surface)
23: blade
23f: leading edge
23p: pressure surface
23r: trailing edge
23s: outer edge
25: impeller flow path
27: concave curved surface
27c: root portion (base portion)
27m: intermediate portion (intermediate portion)
27s: tip portion
30: turbine
31: turbine housing
31s: scroll forming portion
34: scroll flow path
35: nozzle flow path
36: exhaust portion
41: back plate
50: variable vane mechanism
51: nozzle mount
52: nozzle plate
53: vane
54: shaft
55: drive portion
56: drive ring
57: link arm
A: position
B: position
C: central axis
L: straight line (imaginary line)
R: rotation direction
S: region
W: offset dimension

The invention claimed is:

1. An impeller comprising:
a disk which is formed, on one side in a central axis direction, in a disk shape having a disk front surface of a generatrix gradually going further away from a central axis toward a radially outer side as a position on the generatrix in the central axis direction goes from said one side toward the other side in the central axis direction and is rotatably provided around the central axis; and
a plurality of blades which are provided on the disk front surface at intervals in a circumferential direction around the central axis and form a flow path through which a gas introduced from a leading edge on the radially outer side about the central axis is discharged from a trailing edge on the one side in the central axis direction while being introduced into a radially inner side,
wherein a pressure surface of each blade of said plurality of blades includes, in a trailing edge region thereof including the trailing edge, a concave curved surface which is recessed toward a suction surface side,
wherein the concave curved surface is formed such that an intermediate portion between a base portion and a tip portion of the blade offsets to a front side of the blade in the rotation direction with respect to an imaginary line which connects the base portion of the blade and the tip portion of the blade, and
wherein the curvature of the concave curved surface in a cross-section viewed in the central axis direction gradually decreases as the cross-section gets closer to the trailing edge.

2. The impeller according to claim 1,
wherein the concave curved surface is formed in only a partial region in the central axis direction including the trailing edge of the blade.

3. A turbocharger comprising:
a rotating shaft which extends along an axis;
a turbine wheel which includes the impeller according to claim 2 and is provided on a first end portion side of the rotating shaft;
a compressor wheel which is provided on a second end portion side of the rotating shaft;
a bearing housing which rotatably supports the rotating shaft; and
a turbine housing which accommodates the turbine wheel.

4. A turbocharger comprising:
a rotating shaft which extends along an axis;
a turbine wheel which includes the impeller according to claim 1 and is provided on a first end portion side of the rotating shaft;
a compressor wheel which is provided on a second end portion side of the rotating shaft;
a bearing housing which rotatably supports the rotating shaft; and
a turbine housing which accommodates the turbine wheel.

5. The turbocharger according to claim 4, further comprising:
a scroll flow path which is formed in the turbine housing and is continuous in a circumferential direction on the radially outer side of the turbine wheel and through which the gas rotationally driving the turbine wheel flows;
a nozzle flow path which introduces the gas from the scroll flow path toward the radially, inner side and supplies the gas to the turbine wheel; and
a vane which adjusts an introduction amount of the gas in the nozzle flow path.

6. The impeller according to claim 1,
wherein when the disk rotates, the gas introduced from the leading edge forms a flow field, which flows from the radially outer side toward the radially inner side in the vicinity of the trailing edge, in the flow path.

7. A method for forming a flow field for a gas in an impeller including
a disk which is formed, on one side in a central axis direction, in a disk shape having a disk front surface of a generatrix gradually going further away from a central axis toward a radially outer side as a position on the generatrix in the central axis direction goes from said one side toward the other side in the central axis direction and is rotatably provided around the central axis, and
a plurality of blades which are provided on the disk front surface at intervals in a circumferential direction around the central axis and form a flow path through which a gas introduced from a leading edge on the radially outer side about the central axis is discharged from a trailing edge on the one side in the central axis direction while being introduced into a radially inner side,
wherein a pressure surface of each blade of said plurality of blades includes, in a trailing edge region thereof including the railing edge, a concave curved surface which is recessed toward suction surface side, wherein the concave curved surface is formed such that an intermediate portion between a base portion and a tip portion of the blade offsets to a front side of the blade in the rotation direction with respect to an imaginary line which connects the base portion of the blade and the tip portion of the blade, wherein the curvature of the concave curved surface in a cross-section viewed in the central axis direction gradually decreases as the cross-section gets closer to the trailing edge, and wherein when the disk rotates, the gas introduced from the leading edge forms a flow field, which flows from the radially outer side toward the radially inner side in the vicinity of the trailing edge, in the flow path.

8. A method for forming the flow field for the gas in a turbocharger including a rotating shaft which extends along an axis, a turbine wheel which includes the impeller capable of forming the flow field according to claim 7 and is provided on a first end portion side of the rotating shaft, a compressor wheel which is provided on a second end portion side of the rotating shaft, a bearing housing which rotatably supports the rotating shaft, a turbine housing which accommodates the turbine wheel, a scroll flow path which is formed in the turbine housing and is continuous in a circumferential direction on the radially outer side of the turbine wheel and through which the gas rotationally driving the turbine wheel flows, a nozzle flow path which introduces the gas from the scroll flow path toward the radially inner side and supplies the gas to the turbine wheel, and a vane which adjusts an introduction amount of the gas in the nozzle flow path, wherein, in a state ere the nozzle flow path is narrowed by the vane, when the disk rotates, the gas introduced from the leading edge forms the flow field, which flows from the radially outer side toward the radially inner side in the vicinity of the trailing edge, in the flow path.

* * * * *